(No Model.) 2 Sheets—Sheet 2.
C. LA DOW.
DISK HARROW.
No. 437,124. Patented Sept. 23, 1890.
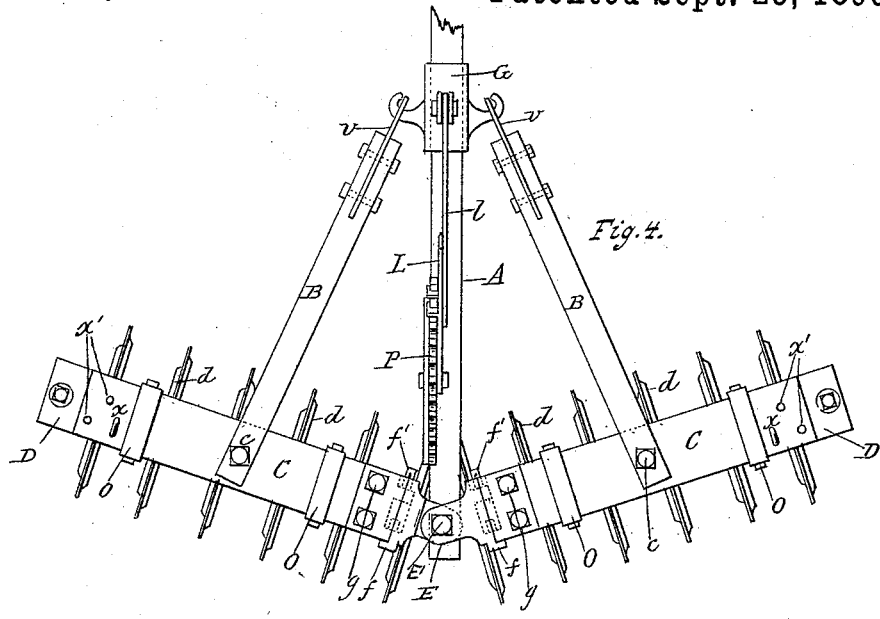
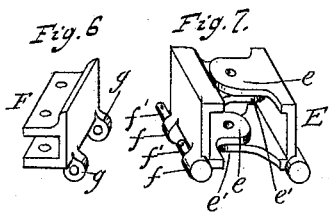
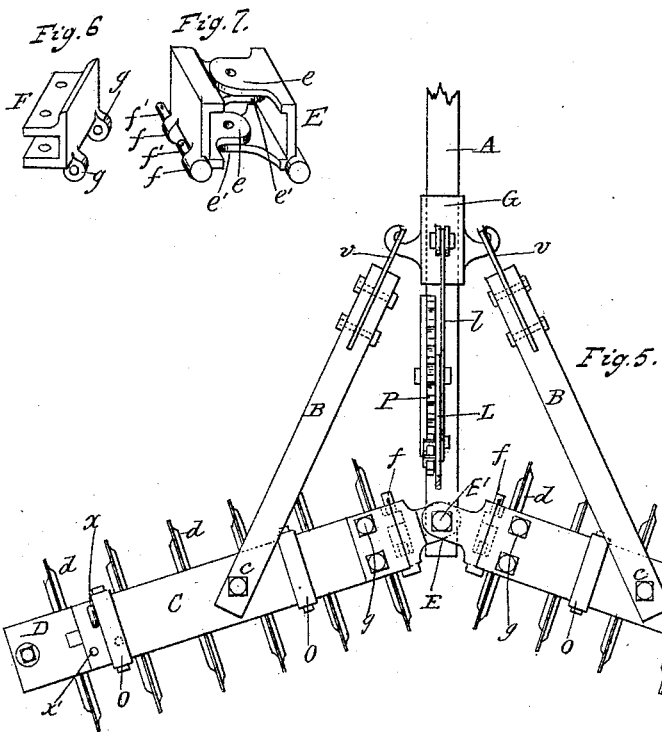
Witnesses:
Chas La Dow
Inventor.
by his Attorney

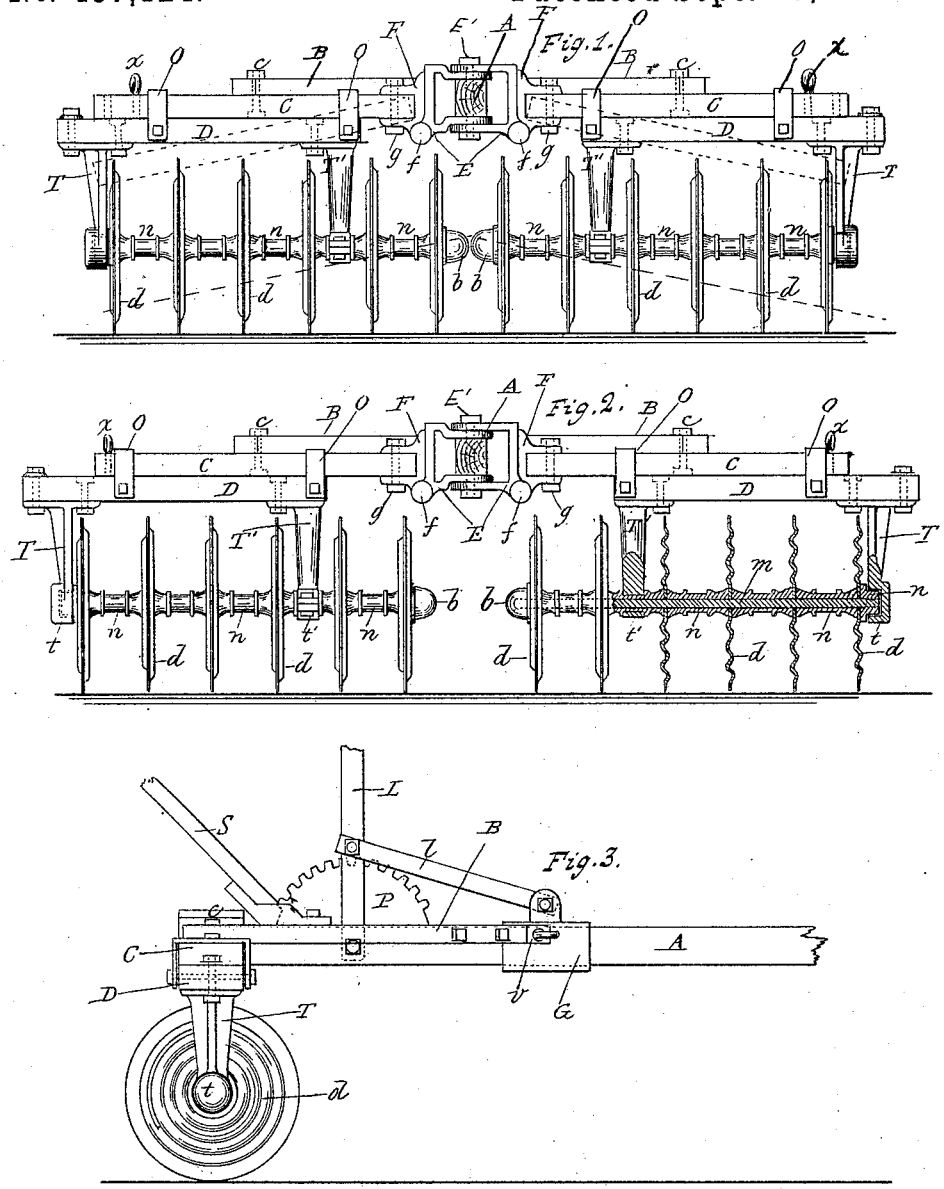

UNITED STATES PATENT OFFICE.

CHARLES LA DOW, OF ALBANY, NEW YORK.

DISK HARROW.

SPECIFICATION forming part of Letters Patent No. 437,124, dated September 23, 1890.

Application filed January 2, 1886. Serial No. 187,421. (No model.)

*To all whom it may concern:*

Be it known that I, CHARLES LA DOW, a citizen of the United States, residing at Albany, in the county of Albany and State of New York, have invented new and useful Improvements in Disk Harrows, of which the following is a specification.

My invention relates to harrows employing rotary disks in gangs adjustable to the line of draft, and thus adjustable both in angling their outer ends forwardly toward the team or rearwardly therefrom.

It also relates to harrows having disks adapted to be self-cleaning when operating without the use of scrapers, and to disk-gangs that are adjustable laterally, relatively to each other, automatically no matter how the gangs are angled, and to disk-gangs attached directly to the pole, and to methods of construction adapted to the requirements of transportation and ready handling of the parts for use.

It also relates to hinging the gangs to the draft-pole by a double-hinge or joint which permits the gangs to follow irregularities in the ground and to have their outer ends angled toward or from the team.

It also relates to hinging the gang-braces to the pole and adapting them to be actuated by a lever to angle the gangs or to coact with the pole when the gangs are being automatically angled by the team.

My invention also relates to novel methods of constructing the disks.

It consists in corrugating the disks in such a manner as to secure greatest strength.

It also consists in adapting non-concaved flat disks with circular corrugations to perform the work of concaved disks in harrowing.

It also consists in providing a system of corrugations on non-concaved or flat disks that increase the strength of the disk against lateral pressures and its efficiency for pulverizing the soil.

My invention also consists in providing a gang of disks with a suitable draft-frame and mechanism for changing their angle quickly, and from the driver's seat, so that the faces of the disks can be rapidly alternated angularly toward the draft, so that the disks may automatically clear themselves without the use of scrapers.

It also consists, further, in adapting the disks to have their working-faces alternated and the gangs to travel laterally, so as to vary their relative distance apart.

It also consists in adapting the gangs to throw the soil toward or from each other as desired, and at the same time to receive the side-thrusts of the gangs at the ends of the gang-axles, no matter in what position they may be angled.

It also consists in adapting the hinged connections between the gangs and tongue to prevent the inner ends of the gangs with their disks from cutting more deeply into the soil than the rest of the gang.

It also consists in providing an adjusting-lever adapted to coact with the pole in receiving and directing the side-thrusts of the gangs upon the pole in the line of draft, without torsion of the pole in the forward and rearward angling of the gangs, and without the necessity of disconnecting any of the operating parts.

It further consists of other combinations and details of construction, hereinafter described and specifically claimed.

The objects and purposes of my invention I preferably accomplish by means of the devices and construction shown in the accompanying drawings, which form part of the specification, and in which—

Figure 1 is a rear view, with the buffers of the inner ends of the gangs in contact, the gang-bar D being slid inwardly upon the secondary or frame bar C. The rear end of the pole is removed, showing the joint E hinging horizontally with the pole A and having on the side of each part of the hinge a ruler-joint F. The braces B B extend from the frames C C forwardly to the pole. Fig. 2 is a rear view showing the gangs and sliding bars D D mounted upon their respective bars C C, also construction of axle *m*, thimble or end bearing *n*, and socket *t*, in standard T. The vertical cross-sections of the disks show the circular corrugations thereof. Fig. 3 is an outer end view of a gang, with side of brace B, and pole and lever L, with its connections, and the sliding sleeve G on the pole through which the lever and braces coact with the pole. Fig. 4 is a top view showing the outer ends of gangs angled forward. Fig. 5 is an end view, with the outer ends of gangs angled rearwardly, also showing the stop $x$ for limiting lateral movement of gangs. Figs. 6 and 7 show the structural arrangement of the combined double hinge and ruler-joint.

The same letters denote the same parts in all the figures.

Obviously the details of construction of the several parts may be varied in various equivalent well-known ways without departing from the spirit of the invention. Some of the parts may be used without the others and in machines differing in construction from that herein shown.

To accomplish the purposes of my invention, I mount a suitable number of disks in gangs on their respective axles, separating the disks by spools $n$ $n$, of suitable dimensions, in the usual manner. These spools may have separable flanges or plates bracing up against the adjacent disks and adapted to the configuration of disk in contact therewith to strengthen the system of parts. The spool and its flange may be in one piece, or the flange may be dispensed with. Each gang I mount by the standards T T and their boxings to $t$ $t$ upon its bar D, and this I mount upon its respective secondary or frame bar C by the bands, loops, or sleeves O O, fastened to D at suitable points apart, adapted to allow the bars D and C to slide laterally or endwise upon each other. Any other suitable mechanism to allow them to play laterally relative to each other may be employed. This lateral motion I limit by suitable movable adjustable stops or pins $x$, for which are provided holes $x'$ or by other suitable appliance to limit this motion inwardly or outwardly. Against this stop the band O strikes to prevent further movement.

Ordinarily the inward movement of the gangs will be limited properly by the buffers $b$ $b$ coming in contact; but instead of these buffers the standards T' may be mounted at the inner ends of the gang-axles, respectively, in which case suitable stops (similar or equivalent to $x$) may be provided to limit the inward lateral thrust of the gangs. In this way the gangs may be set and retained at any required distance apart, or may be allowed to move automatically toward each other, or apart laterally, according to the angularity of the gangs relatively to the line of draft and the consequent side-thrust inwardly or outwardly of the gangs. By this arrangement I overcome the difficulty incident to gangs intended to be angled rearwardly at their outer ends from the team—viz., the clogging of the soil between the inner end disks of each gang—for in this structure, where the gangs are angled backward, they will automatically move apart, as shown in Figs. 2 and 5, sufficiently to prevent the soil clogging between their inner end disks, and when the gangs are angled forward at their outer ends the reverse motion is imparted to them, and they approach each other laterally, as shown in Figs. 1 and 4.

The standard T', I construct in the usual way, and T, I core out at $t$ into a circular box to receive the end-thrust of the gang.

Upon the axle $m$, at its outer end, I mount the spool $n$, adapted to rotate in the box $t$. Preferably I screw to the axle this spool or nut $n$ and provide it with a suitable shoulder toward the adjacent disk, so that the side-thrust of the gang is imparted from the axle end to the standard. The inner ends are provided with buffers $b$ $b$; but when standards take the place of the buffers I construct said standards similar to those already described. In either construction at whatsoever angle the gangs may be set the mechanism described herein is adapted to receive the side-thrusts of the gangs on the ends of the axles.

Upon the rear end of the pole A, I hinge the inner ends of the frame-bars, so that each may have separate and independent motion. Preferably I mount each of the frame-bars C C on the pole by the double-jaw hinge E, constructed in two parts. Each part has two jaws $e$ $e'$, adapted to overlap the jaws of its fellow, and between these sets of overlapping jaws I mount the pole and pass a bolt E' through the double jaws and pole, thus forming a double hinge pivotal upon the pole. To each of these two hinge parts I fasten a frame-bar C, so that the outer end of each gang can swing forward toward the team, or at right angles to the pole, or rearwardly from the team in a plane parallel with the surface of the ground. Each gang-bar may be fastened to its respective part of this double hinge with any form of hinge; but I preferably make the attachment by means of a rule-joint hinge or its equivalent, whereby each gang can be vibrated or bent vertically in a plane at right angles to the surface of the ground, hinging from the inner end of the gang, the rule-joint having a lock in one direction to prevent the inner ends of the gangs cutting too deep and settling. Each gang I bolt firmly at $g$ to the part F', which hinges with E on the pintles and shoulders $f$ $f'$. By this means the gangs, however they may be angled horizontally, may independently be angled downward from a horizontal position in a plane parallel to the ground, bending from the pole, but cannot be angled upward from the pole out of a horizontal position relatively to each other, and consequently the weight of the driver poised over the double joint on the pole cannot cause the inner ends of the gangs to sink below a level and cut into the ground deeper than the outer ends; but the outer ends of the gangs will vibrate vertically downward to follow the irregularities of the soil and perform their functions.

Upon the pole at a suitable distance forward of its rear end I mount a sleeve G and provide the same with the hooks $v$ $v$ on each side.

Upon each gang-bar C C, and suitably midway between its ends at $c$ $c$, I pivot the rear end of its respective brace B B, whose forward end, by means of its eye $v$ $v$, I hook to the sleeve G, whereby the said braces will act to perform their functions, and yet be free to follow without torsion the angling of the gangs in either a horizontal or vertical plane, or both together, unaffected by lateral motion of the gangs. At the same time, in any position, of the gangs the braces will convey the pressure or thrusts of the gangs directly upon the pole without torsion thereof and in the line of draft.

Upon the pole, rearwardly of the sleeve, I mount the lever L, with its ratchet P, and connect it by link $l$ to the sleeve G, whereby (by operating the lever) the sleeve will be moved backward or forward upon the pole, and will carry with it the braces B B to actuate the outer ends of the gangs forward or backward angularly from their hinge-connection at the rear end of the pole, Figs. 3, 4, and 5.

The driver's seat may be mounted upon the pole conveniently in any of the usual well-known ways.

When the dog on lever L is unlocked from its ratchet, obviously by backing the team, the pole A will be pushed backward and with it the inner ends of the gangs hinged thereto, and the sleeve will slide forward on the pole, and the gangs will thereby be angled forward by the power of the team independently of the lever, and, conversely, by starting the team forward the gangs can be angled backward, Figs. 4 and 5, respectively, without using the lever.

In this structure plain flat disks may be efficiently used when the gangs are set at any angle; but corrugated disks are preferable, and I use non-concaved or flat disks provided with concentric corrugations, $d$ $d$, Figs. 2 and 3. I construct my disks of a single plate of metal with corrugations in concentric circles about the axle-hole, so that all or nearly all parts of the disk shall present corrugations on both sides thereof, but preferably leaving the outer edge uncorrugated to be a cutting-edge and to secure deep penetration; also, I construct the disk preferably tapering in thickness from the center to the circumference. These corrugations act as braces upon the disk in every direction against strains that come upon it in operation, so that less material is required to construct a disk of efficient strength and capacity. Furthermore, the corrugated surfaces act like a concaved surface to cause the disks to cut into the soil by suction and to break up and pulverize the soil, while, unlike the concaved disk, it is capable of operating efficiently when either side is presented angularly to the soil in harrowing. Furthermore, in all disks heretofore made there is a tendency to collect soil and clog upon the front face of the disk, which is turned angularly across the line of the draft; but this invention contemplates angling the gangs forward or backward, so as readily to change the lifting face of the disk and present first one and then the other to the line of draft, so that while one face is lifting the other is in the furrow made by the disk, and is being cleaned of all the clogging soil that may have collected thereon. The vibration imparted to each disk by plowing through the soil aids to shake clogging matter from the non-lifting face and its corrugations. Reversing the angularity of the disks reverses the working-faces of the disks and presents to the soil the cleaned face for lifting and reverses the clogged face to the rear to be cleaned.

In disks heretofore made, whether flat or concaved, the lifting side of the disk only would become polished through use, while the non-lifting face soon becomes rusty and is then more liable to clog; but in this invention both sides of the disks are alternately made lifting-faces. Consequently both have an equal chance to become polished and to remain so, insuring perfection of work and also increased durability.

In my construction as described when the gangs are angled inwardly, Fig. 4, the tendency in the operation of the disks is to thrust the gangs laterally toward each other, and obviously the gang-bar D being adapted to move endwise relatively to C the inner disks will approach each other automatically till the buffers $b$ $b$ are in contact, which buffers will then receive the lateral thrusts of the gangs, Fig. 1. Conversely, when the gangs are angled rearwardly, Fig. 5, the tendency of the gangs is to move apart until stopped by $x$ or its equivalent, thereby leaving any desired space between the inner ends of the gangs for the passage of the furrows that are thrown toward each other, Fig. 2. In this attitude, Fig. 5, the gangs being thus separated to any desired distance are also adapted to stride a furrow and to fill the same, while in the other attitudes the inner disks are adapted to cut down a ridge.

By the method employed by hinging the gangs to the pole the tendency of the inner ends of the gangs to cut into the soil deeper than the outer ends is obviated, and any weight (as of the driver) over the inner ends of the gangs or upon the pole will not cause the inner ends of the gangs to cut deeper, the construction of the rule-joint $f$ $f$ preventing, with its shoulders F F, any upward tendency of the outer ends of the gangs relatively to the inner ends more than will bring said outer ends in a horizontal line with the inner ends of the gang-frame structure. At the same time, however, the rule-joint permits the outer end of each gang, independently of the other gang, to drop vertically from a horizontal plane, to allow it to follow the inequalities of the ground to be pulverized. Obviously, also, by this structure the gangs can be suitably varied and locked at any desired distance apart by the adjustable stops on either side of the loops or sleeves O O, as hereinbefore described, or can be adapted to work or vibrate laterally or endwise automatically within a prescribed limit. Obviously, also, the organization of the parts constitutes a suitable frame which can readily be dismembered or put in use, and when in use can readily be operated by the team or by the driver from his seat, so as to cause the gangs to automatically advance to and occupy any required position, either as relates to distance apart or as to whether the furrows shall be thrown toward or from the space between the gangs, and also as to reversing the working-faces of the disks.

This invention contemplates, broadly, any organization of parts that shall enable the driver to alternate the working-faces of the disks without stopping the machine. It also broadly contemplates any organization of parts that shall enable gangs of disks to throw the earth either toward or from each other, and at the same time be provided with mechanism which shall correspondingly and alternately counteract their side-thrusts at the ends of the gang-axles. It also broadly contemplates such organization of parts as shall enable gangs of disks to have their working-faces alternated, and also permit the distance between the gangs to be varied automatically or otherwise.

Having described my invention, what I claim, and desire to secure by Letters Patent, is—

1. In a harrow or plow, a cutting-disk for turning the earth, having concentric corrugations adapted to strengthen the disk against lateral pressure.

2. In a harrow or plow, a cutting-disk for turning the earth, having concentric corrugations indented into its face, in combination with a frame for supporting the disk.

3. In a harrow or plow, a cutting-disk for turning the earth, having concentric rings raised on its side and a frame for supporting the same, in combination with mechanism for varying the angle of the disk.

4. In a harrow or cultivator, a main frame, opposing gangs of disks having similar sides and adapted to present either side to the draft, and revolving shafts upon which said disks are rigidly mounted, in combination with mechanism operated from the driver's seat for adjusting said gang-shafts to different angles relatively to the draft-line for alternating the working sides of the disks to throw the earth from or toward the center of the machine.

5. In a harrow, a main frame, opposing gangs of disks having similar sides and adapted to present either side to the draft, and revolving shafts upon which said disks are rigidly mounted, in combination with mechanism for adjusting said gang-shafts to different angles relatively to the draft-line, so as to throw the earth toward or from the center of the machine, which mechanism is adapted to adjust the disks without stopping the progress of the machine.

6. In a harrow, a main frame, two disk-gangs each adapted to have their disks alternately present toward the draft first one side and then the other at the will of the operator, and mechanism for alternating the working sides of the disks, in combination with mechanism for receiving the end-thrust of each gang alternately on the inner and outer ends of its gang-axle.

7. In a disk harrow, a main frame and disk-gang, in combination with a buffer at one end of the gang-axle and a standard or arm at the other end for receiving the end-thrust of the disk-gang.

8. In a harrow, a pole or frame and a disk-gang, in combination with a rule-joint hinge adapted to permit vertical vibration of the disk-gang relatively to the pole in one direction only.

9. In a harrow, a main frame, a disk-gang adapted to move laterally relatively to the main frame, and a stop for limiting said lateral movement, in combination with mechanism applied to the end of the gang-axle for receiving the end-thrust of the disks.

10. The combination of a pole or frame, disk-gangs connected therewith, the disks in which have similar sides and are adapted to present either side to the draft, mechanism for adjusting the gangs relatively to the draft-line to present the inner or outer sides of the disks to the draft in order to throw the earth toward or from the center of the machine, and means for adjusting the gangs endwise relatively to each other.

CHARLES LA DOW.

Witnesses:
B. I. STANTON,
DAVID S. SAXE.